United States Patent
Fink et al.

(10) Patent No.: US 7,603,874 B2
(45) Date of Patent: Oct. 20, 2009

(54) SPLIT POWER INPUT TO CHILLER

(75) Inventors: James R. Fink, Exeter, RI (US); John H. Bean, Jr., Wentzville, MO (US)

(73) Assignee: American Power Conversion Corporation, West Kingston, RI (US)

( * ) Notice: Subject to any disclaimer, the term of this patent is extended or adjusted under 35 U.S.C. 154(b) by 641 days.

(21) Appl. No.: 11/041,768

(22) Filed: Jan. 24, 2005

(65) Prior Publication Data

US 2006/0162357 A1     Jul. 27, 2006

(51) Int. Cl.
*F25D 17/02* (2006.01)
*H02J 7/00* (2006.01)
*H02J 9/00* (2006.01)

(52) U.S. Cl. ............................. 62/434; 62/201; 307/64

(58) Field of Classification Search .................... 62/201, 62/185, 228.1, 434, 177, 430, 400; 307/64
See application file for complete search history.

(56) References Cited

U.S. PATENT DOCUMENTS

| | | | |
|---|---|---|---|
| 4,706,883 A * | 11/1987 | Fleischmann | 237/2 B |
| 5,970,729 A | 10/1999 | Yamamoto et al. | 62/178 |
| 6,334,331 B1 | 1/2002 | Chen et al. | 62/434 |
| 6,813,897 B1 | 11/2004 | Bash et al. | 62/175 |

FOREIGN PATENT DOCUMENTS

| | | |
|---|---|---|
| DE | 1 601 874 | 2/1971 |
| DE | 37 04 182 A1 | 8/1988 |
| DE | 40 14 435 A1 | 11/1991 |
| EP | 1 134 523 A1 | 9/2001 |

OTHER PUBLICATIONS

International Search Report and the Written Opinion of the International Searching Authority, mailed Jun. 7, 2006.

* cited by examiner

*Primary Examiner*—Chen-Wen Jiang
(74) *Attorney, Agent, or Firm*—Lando & Anastasi, LLP

(57) ABSTRACT

A chiller for supplying chilled fluid for cooling a room includes two distinct power inputs. A critical power input is configured to supply power to a controller and to a pump in a chilled-fluid loop that circulates a cool working fluid through an air handler 34 to cool the air in the air handler. A non-critical power input is configured to supply power to a compressor and, possibly, other elements of a refrigeration loop that includes an evaporator, the compressor, and a condenser to provide refrigeration via an evaporation/condensation cycle. When power is lost to the non-critical power input, the critical power input can continue to independently power the circulation of the working fluid through the chilled-fluid loop to continue to provide a level of cooling in the air handler.

19 Claims, 1 Drawing Sheet

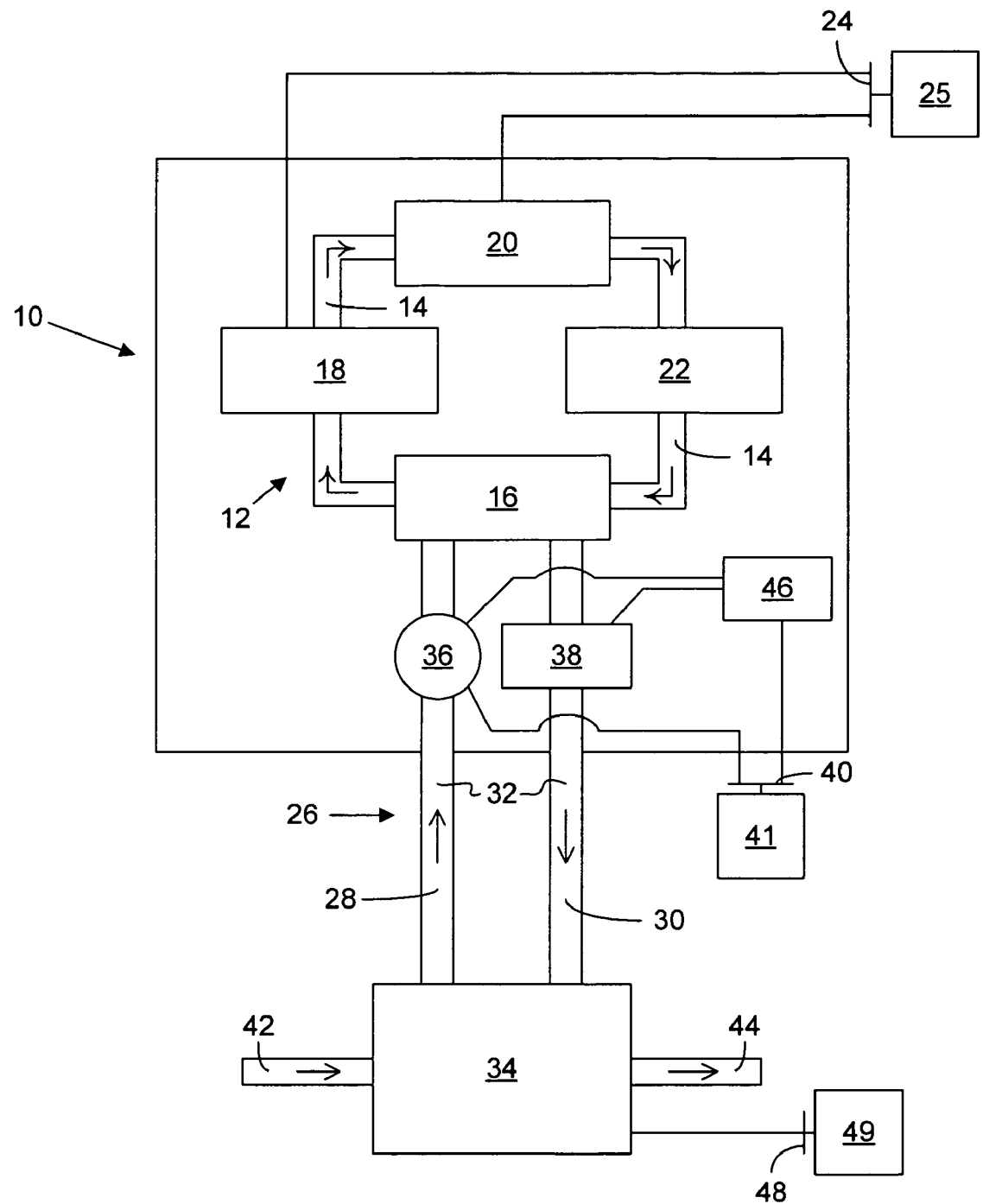
FIGURE

SPLIT POWER INPUT TO CHILLER

BACKGROUND

A chiller is a component of an air-conditioning system that can be used to cool the air in a room. One or more pumps, which may or may not be integral to the chiller, circulate a working fluid, such as water, in a chilled-fluid loop from an air handler to an evaporator. In the air handler, the working fluid can extract heat from air in the room to be cooled. In the evaporator, the heat that was picked up by the working fluid in the air handler is then transferred from the working fluid to the colder refrigerant fluid in the refrigeration loop.

In one variety of chillers, the refrigeration loop that cools the chilled-fluid loop is a compression direct-expansion refrigeration circuit. This refrigeration loop includes, in addition to the evaporator, a compressor, a condenser and an expansion mechanism. The refrigerant fluid absorbs heat from the working fluid in the evaporator, where the refrigerant fluid is vaporized, and then dumps that heat in the condenser as the vaporized refrigerant fluid is re-condensed.

The chiller typically includes four main types of power-consuming components, including compressors, chilled-water circulating pumps, a controller, and condenser fans. All of these components are typically fed from a common point of power application to the chiller. When power is lost to the chiller, the operation of each of these components thereby ceases, resulting in a prompt loss of heat-removal capacity from the building or equipment being cooled.

In one application, chillers are used to cool computer rooms, where computer components can generate substantial operational heat. By removing this heat, a desired room temperature can be maintained to thereby help ensure that the computer components therein do not overheat. Generators are sometimes employed to allow continued operation of the chiller during a power loss.

SUMMARY

Disclosed in greater detail, below, is a chiller that includes a chilled-fluid loop in which a working fluid is circulated and a refrigeration loop in which a refrigerant fluid is circulated, each loop powered by a distinct power input. While a non-critical power input is configured to supply power to a compressor in the refrigeration loop, a critical power input is configured to supply power to a controller and to a pump in the chilled-fluid loop. When power is lost to the non-critical power input, a critical power source, such as an uninterruptible power source can continue to power the circulation of the cool working fluid in the chilled-fluid loop, absent operation of the refrigeration loop.

These apparatus and methods can enable a chiller to maintain critical-component operation during a power loss by exploiting the low level of stored energy in the working fluid in the chilled-fluid loop to provide a period of continued heat removal from the air after a power loss.

In computer rooms, an uninterruptible power source possessing, e.g., chemically stored energy can be provided to continue to supply power to the computer components for a period of time following a power outage. Absent continued cooling, however, the investment of an uninterruptible power source may be rendered useless because excessive room temperature resulting from the interruption in power supply to the cooling system can occur in a period of time as short as 60 seconds or less. These high temperatures can result in the shut down or improper operation of critical computer equipment prior to the expiration of the power supply from the uninterruptible power source. By using the remaining heat-removal capacity in the working fluid in the chilled fluid loop [typically at a cool temperature of 42° F. to 50° F. (about 6° to 10° C.) upon exiting the evaporator] by operating a pump and controller absent operation of the compressor and other components in the refrigeration loop, sufficient cooling can nevertheless be provided to prolong the operation of the computer components without overheating in the event of a power loss. Further still, the run time of component operation via an uninterruptible power supply can be matched or nearly matched with the run time of the cooling provided by the uninterruptible cooling supply, described herein.

The apparatus and methods of this disclosure can be used as a substitute or in addition to the use of a generator to power chiller components in the event of a power loss. The generator requires a period of time to start, during which cooling is lost; and the generator can fail to start. The continued circulation of the working fluid in the chilled-fluid loop during power outage, however, can remedy both of these problems. Further, these methods and apparatus for continued cooling offer a period for safe and graceful shutdown of computer equipment from the moment of power loss.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

The FIGURE is a schematic illustration of an embodiment of a chiller apparatus of this disclosure.

DETAILED DESCRIPTION

I. The Chiller Apparatus

As shown in the embodiment of the FIGURE, the chiller apparatus 10 includes a refrigeration loop 12 and a chilled-fluid loop 26.

(A) The Refrigeration Loop:

Refrigerant fluid, typically R-22 (HCFC-22) is circulated through the refrigeration loop 12 via a conduit 14. Alternatively, a variety of other refrigerant fluids, such as R-134A, R-407C, and R-410A, can be used. The conduit 14 passes through an evaporator 16, wherein the refrigerant fluid is vaporized. The conduit 14 next passes through a compressor 18, which compresses the vaporized fluid. The conduit 14 then passes through a condenser 20, which can include one or more fans configured to pass fluid across the conduit 14 to extract the heat of vaporization and condense the refrigerant fluid therein. Next, an expansion mechanism 22 (e.g., a valve or a constricted orifice) is provided, across which a pressure differential in the conduit 14 is created. Finally, the conduit 14 returns to the evaporator 16, where the refrigerant fluid can again be vaporized as it is heated.

A non-critical power input 24 in the form of a terminal input block is wired to the fan(s) of the condenser 20 and to the compressor 18 (i.e., to the components that consume the most power in the chiller). A non-critical power source 25 (most commonly from raw utility power and optionally backed up by an on-site generator but lacking an uninterruptible power source) is coupled with the input 24 for distributing power to the components wired thereto. For these components, the non-critical power source 25 can be the sole source of power.

(B) The Chilled-Fluid Loop:

A working fluid, such as water or a mixture of water and ethylene glycol (or other freeze- and/or corrosion-protection agents), is circulated through the chilled-fluid loop 26 via a return line 28 and a supply line 30 of a conduit 32. The conduit 32 extends between the evaporator 16 and an air handler 34. The air handler 34 is coupled with a hot-air input duct 42 and a cool-air output duct 44, each duct 42/44 having an inlet/outlet in the room to be cooled. The air handler 34 also includes a fan for drawing air from the room through the air handler 34 to achieve continuous circulation of the air. Where it passes through the air handler 34, the conduit 32 of the chilled-fluid loop 26 is exposed and can be in the form of a coil to increase the surface area for heat exchange from the air to the conduit 32 (and to the working fluid passing through the conduit 32). The conduit 32 can likewise be in the form of a coil in the evaporator 16 to increase the surface area for heat exchange between the chilled-fluid loop 26 and the refrigeration loop 12.

A pump 36 is provided in the return line 28 of the conduit 32 for pumping the working fluid through the chilled-fluid loop 26. A storage tank 38 for storing working fluid after it leaves the evaporator 16 is provided in the supply line 30 of the conduit 32. Alternatively, the pump 36 can be placed in the supply line 30 and the storage tank 38 in the return line 28, or both can be placed in the same line 28/30.

A critical power input 40 in the form of a terminal input block is wired to a control computer 46 and to the pump 36. A critical power source 41 is electrically coupled with the critical power input 40 to thereby enable the critical power source 41 to power the controller 46 and pump 36.

The critical power source 41 can be, e.g., an uninterruptible power source, such as a "static" uninterruptible power source (e.g., from the Silicon Series or from the Symmetra Series, both from American Power Conversion Corp., W. Kingston, R.I., USA). Static uninterruptible power sources are characterized by the following: a rectifier that converts alternating-current power to direct-current power and that charges batteries, an inverter that converts the direct current back to alternating current for supply to the load, and a storage element, most commonly a lead-acid battery to supply the direct-current bus when the rectifier is unable to do so for lack of reliable input alternating-current power.

Alternatively, the critical power source 41 can be, e.g., an engine generator, a flywheel uninterruptible power source, a fuel cell/inverter combination, a solar/inverter combination, an independent utility, or an onsite turbine generation plant.

II. The Cooling Process (A) Normal:

Absent any power disruptions, in the "normal" operation of the chiller 10, the compressor 18 pumps the refrigerant fluid through the condenser 20 and thereby drives the refrigerant-fluid flow through the refrigeration loop 12. As it pumps the refrigerant fluid, the compressor 18 also increases the pressure and temperature of the refrigerant fluid.

As the refrigerant fluid is pumped into the condenser 20 by the compressor 18, heat from the refrigerant fluid is extracted (e.g., to the outdoor environment) by a cooling gas or liquid passed across the refrigeration conduit 14, which can be in the form of a coil to increase its exposed surface area in the condenser 20. As the temperature of the refrigerant fluid drops in the condenser 20, its pressure remains relatively constant until the refrigerant fluid reaches a saturation (condensation) point. The heat released from the refrigerant fluid upon condensation can be approximately equal to the heat of vaporization picked up by the refrigerant fluid in the evaporator 16 (discussed, below). After condensing, the refrigerant fluid leaves the condenser 20 as a liquid.

The refrigerant fluid then flows through the expansion mechanism 22, which serves to maintain the pressure differential between the evaporator 16 and the condenser 20 in the refrigeration loop 12. As the refrigerant fluid passes through the expansion mechanism 22 and into the evaporator 16, it undergoes a pressure drop and its temperature is lowered. The evaporator 16 serves as a heat exchanger, transferring heat from the comparatively warm working fluid (e.g., water or a mixture of water and ethylene glycol) in the chilled-fluid loop 26 to the refrigerant fluid in the refrigeration loop 12 as the refrigerant fluid is vaporized.

The pump 36 controls the rate of fluid flow through the chilled-fluid loop 26. The pump 36, in turn, is controlled by the controller 46. The controller 46 can also be coupled with a temperature sensor in the computer room or in the conduit through which the hot air flows, and the rate of pumping can be increased or decreased (to respectively provide more or less cooling) as the temperature readings from the computer room respectively increase or decrease. The heat generated by computer components and dissipated to the air of the computer room rises and falls as the workload demand on the computer components in the computer room respectively rises and falls. The component-generated heat is extracted from the air of the computer room by the working fluid in the air handler 34.

As the working fluid is pumped from the air handler 34 to the evaporator 16, and as heat is transferred from the working fluid in the chilled-fluid loop 26 to the refrigerant fluid in the refrigeration loop 12, the temperature of the working fluid in the chilled-fluid loop 26 drops to about 42° to about 50° F. (about 5° to about 10° C.) as it leaves the evaporator 16 under normal chiller 10 operation.

(B) With a Power Disruption:

In the event of a disruption in the power supply from the non-critical power source 25 (e.g., where a storm forces down a supplying power line), the compressor 18 stops pumping, and the refrigeration cycle shuts down.

Nevertheless, the critical power source 41 can continue to supply power to the controller 46 and pump 36 when the non-critical power source 25 fails. Consequently, the cool working fluid continues to circulate through the chilled-fluid loop 26, notwithstanding the shutdown of the adjoining refrigeration loop 12. The role of the refrigeration loop 12 as a heat sink for the chilled-fluid loop 26 will now be greatly reduced; and the temperature of the working fluid will gradually rise with each pass through the air handler 34. Nevertheless, the working fluid will continue to extract heat from the air of the computer room as long as the temperature of the working fluid is below that of the air.

Eventually, the temperature of the working fluid may rise to that or nearly that of the air and may, consequently, no longer be able to effectively cool the computer room. Nevertheless, the period of time for which cooling is provided by the working fluid from the time of power failure enables the continued or prolonged safe operation of the computer components in the computer room and/or the safe and graceful shut down of the computer components.

The stored cooling capacity in the chilled-fluid loop 26 is increased by the inline storage tank 38, which increases the volume of chilled working fluid in the loop 26. The greater the volume of the storage tank 38, the greater the potential stored cooling capacity of the working fluid in the chilled-fluid loop 26.

The controller 46 can also be coupled with components in the refrigeration loop 12 or with the non-critical power input 24 and can therefore be made "aware" of a power outage at the non-critical power input 24. The controller 46 can optionally adjust (e.g., accelerate) operation of other components, such as the pump 36, in response thereto. However, responsive adjustments of this nature are unnecessary for basic operation of the chiller during a power outage to maintain the flow of fluid through the chilled-fluid loop 26.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

What is claimed is:

1. A chiller for supplying chilled fluid for cooling a room, the chiller comprising:
   a chilled-fluid loop comprising a conduit and a pump mounted to circulate working fluid through the conduit;
   an evaporation/condensation refrigeration loop comprising a conduit, an evaporator, a compressor, and a condenser, wherein the refrigeration loop is in thermal communication with the chilled-fluid loop at the evaporator;
   a controller configured to control at least the pump of the chilled-fluid loop;
   a critical power input configured to supply power to the controller and to the pump; and
   a non-critical power input distinct from the critical-power input and configured to supply power to the compressor.

2. The chiller of claim 1, wherein an exposed section of the chilled-fluid loop is in thermal communication with air from the room to be cooled.

3. The chiller of claim 2, wherein the exposed section of the chilled-fluid loop passes through an air passage extending from the room, and a fan is provided in the air passage for drawing air from the room, through the passage, and across the exposed section of the chilled-fluid loop.

4. The chiller of claim 1, wherein the condenser includes a fan positioned to pass air across a section of the refrigeration loop to extract heat from a refrigerant fluid in the refrigeration loop and thereby condense the refrigerant fluid in the refrigeration loop, and wherein the fan is configured to be powered solely by the non-critical-power input.

5. The chiller of claim 1, wherein the evaporator is configured to extract heat from the working fluid in the chilled-fluid loop to evaporate the refrigerant fluid in the refrigeration loop.

6. The chiller of claim 1, wherein an uninterruptible power source is coupled with the critical power input for supplying power to the pump and to the controller.

7. The chiller of claim 1, wherein the chilled-fluid loop contains water.

8. A method for operating a chiller, the method comprising:
   coupling a non-critical power source with a compressor in a refrigeration loop configured for circulating refrigerant fluid through an evaporation/condensation cooling cycle; and
   coupling a critical power source with a controller and with a pump in a chilled-fluid loop that is in thermal communication with the refrigeration loop and with air from a room, the chilled-fluid loop being configured for circulating working fluid therethrough.

9. The method of claim 8, further comprising:
   powering the compressor with the non-critical power source;
   powering the controller and pump with the critical power source; and
   upon disruption of the power supply from the non-critical power source, continuing to power the controller and the pump with the critical power source to continue to circulate working fluid in the chilled-fluid loop absent operation of the compressor in the refrigeration loop.

10. The method of claim 8, wherein the working fluid in the chilled-fluid loop comprises water.

11. The method of claim 8, further comprising circulating air from a room across an exposed section of the chilled-fluid loop to transfer heat from the air to the working fluid in the chilled-fluid loop.

12. The method of claim 8, further comprising coupling the non-critical power source with a fan configured to cool refrigerant fluid in a condenser in the refrigeration loop.

13. The method of claim 8, wherein the compression of the refrigerant fluid in the refrigeration loop is powered solely by the non-critical power source.

14. The method of claim 8, wherein the pumping of the working fluid in the chilled-fluid loop is powered solely by the critical power source.

15. The method of claim 8, wherein the critical power source is an uninterruptible power source.

16. The method of claim 15, wherein the uninterruptible power source stores chemical energy.

17. A method for operating a chiller through a disruption in a power supply, the method comprising:
   circulating working fluid in a chilled-fluid loop and passing air from a room across an exposed section of the chilled-fluid loop to cool the air;
   circulating refrigerant fluid in a refrigeration loop for cooling the working fluid in the chilled-fluid loop, the refrigerant fluid in the refrigeration loop being evaporated by an evaporator, compressed by a compressor and condensed by a condenser in a refrigeration cycle; and
   upon the disruption of the power supply, allowing the compression of the refrigerant fluid in the refrigeration loop to be halted, while continuing to pump working fluid through the chilled-fluid loop and while continuing to pass air from the room across the exposed section of the chilled-fluid loop,
   wherein the circulation of working fluid in the chilled-fluid loop is powered by a power source distinct from the power source that powers the compressor.

18. The method of claim 17, wherein the circulation of working fluid in the chilled-fluid loop is powered by an uninterruptible power source.

19. The method of claim 17, wherein water is circulated in the chilled-fluid loop.

* * * * *